United States Patent [19]
Koch et al.

[11] 3,821,854
[45] July 2, 1974

[54] DEPTH MICROMETER

[76] Inventors: Edwin Koch, R.D. No. 1, Deposit, N.Y. 13754; William Koch, 150-19 Eleventh Ave., Whitestone, N.Y. 11357

[22] Filed: Jan. 26, 1973

[21] Appl. No.: 326,872

[52] U.S. Cl............................. 33/169 B, 33/164 R
[51] Int. Cl. ............................................. G01b 3/28
[58] Field of Search .......... 33/169 B, 178 R, 164 R, 33/166, 167, 181 AT, 169 R, 169 C, 169 D, 164 C, 164 P

[56] References Cited
UNITED STATES PATENTS

| | | | |
|---|---|---|---|
| 495,019 | 4/1893 | Carter et al. | 33/164 C |
| 519,541 | 5/1894 | McBride | 33/167 |
| 2,520,022 | 8/1950 | Vobeda | 33/169 B |
| 2,844,881 | 7/1958 | Stunkel | 33/178 R |

*Primary Examiner*—Louis R. Prince
*Assistant Examiner*—Willis Little
*Attorney, Agent, or Firm*—Richard G. Stephens

[57] ABSTRACT

A precision depth micrometer gauge comprises a block having a flat reference surface from which a measuring rod adjustably extends, the measuring rod being slidably and non-rotatably supported within a shaft extending from the block, with an internally threaded barrel fixedly mounted on the end of the shaft. A pair of coaxial interconnected sleeves surround the shaft and rod, the inner sleeve being in threaded engagement with the barrel and both sleeves being rotatable relative to the rod. The end of the outer sleeve remote from the block is read against a scale inscribed on the barrel. The arrangement provides additive direct reading, so that measurements are calculated in the same manner as with a caliper micrometer guage.

8 Claims, 5 Drawing Figures

PATENTED JUL 2 1974  3,821,854
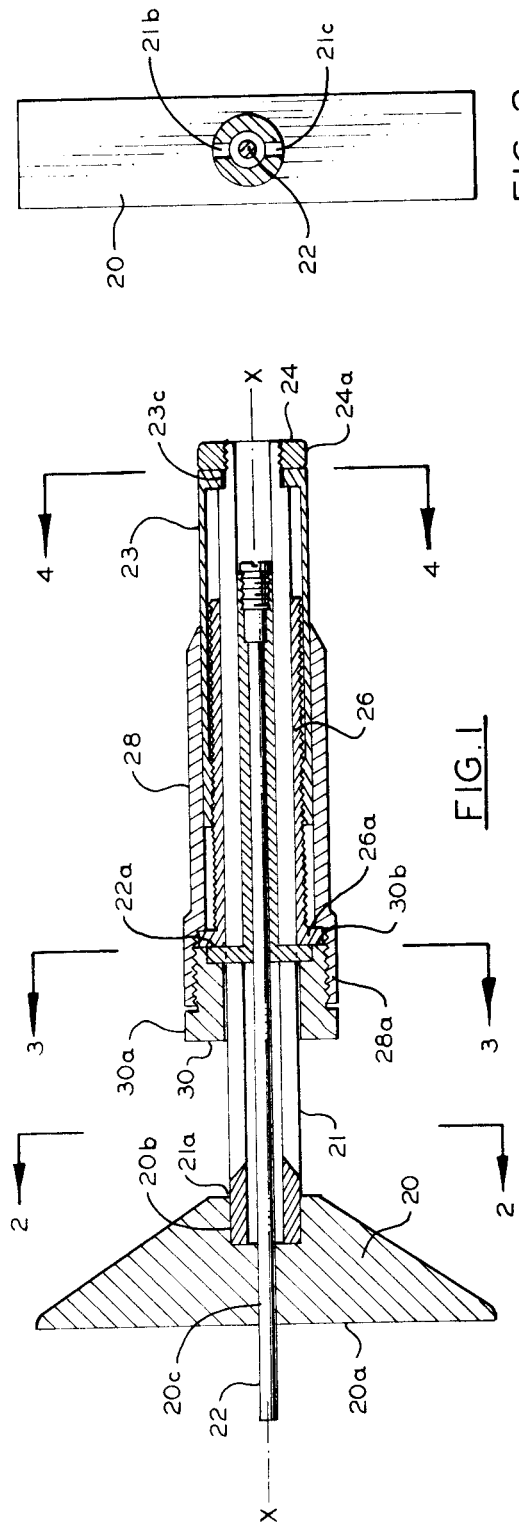
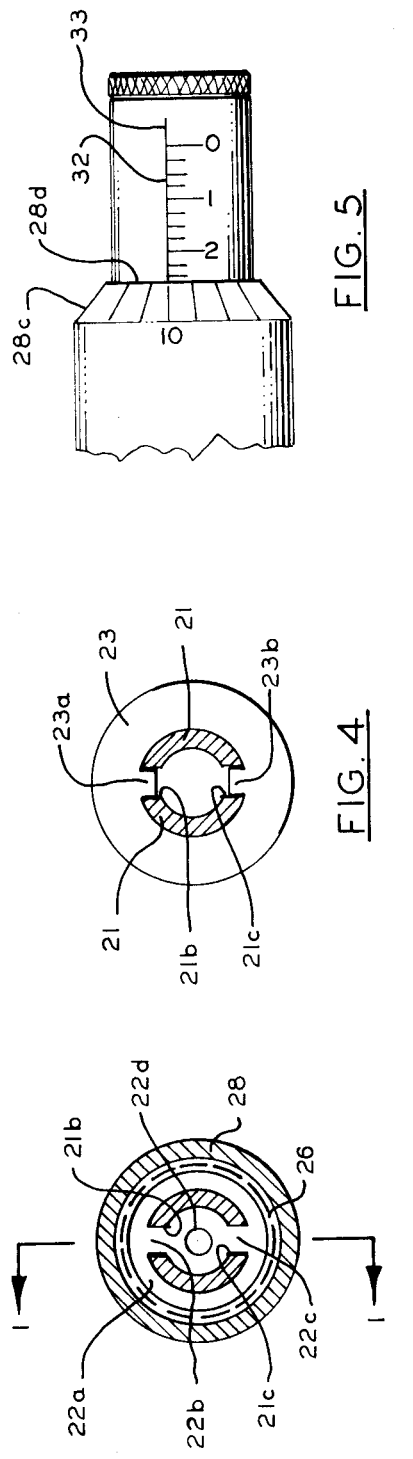

DEPTH MICROMETER

In precision machine shops, machinists commonly use two different types of micrometer measuring devices to measure dimensions of workpieces and the like, the two types comprising (1) micrometer caliper gauges and (2) depth micrometer gauges. Micrometer caliper gauges are used to measure the outside dimensions of various items, such as the thickness of various flat pieces and the outside diameters of shafts and the like. Typical micrometer caliper gauges comprise a generally U-shaped body having a barrel extending outwardly from one leg, and a rotatable shaft member threaded through the barrel so that rotation of the member in one direction or the other extends or retracts the end of the shaft member toward or away from an anvil surface provided on the other leg of the U-shaped body. A sleeve connected to the shaft member covers or uncovers the members and graduations of a linear scale marked on the barrel as the end of the shaft member moves toward or away from the anvil surface. The outside dimension of a workpiece is measured by rotating the shaft until the end of the shaft and the anvil engage opposite sides of the workpiece, and then the end of the sleeve is read against the scale carried on the barrel. A vernier scale comprising graduations spaced around the periphery of the end of the sleeve is usually provided to allow interpolation between the graduations of the linear scale marked on the barrel and greater accuracy. With such an arrangement, measurement of increasing dimensions requires that the end of the shaft member be retracted further from the anvil, and as the shaft is so retracted, the sleeve uncovers increasingly larger numbers marked along the linear scale. The machinist can determine the measured or calipered dimension by adding together three quantities: (1) the largest number uncovered on the linear scale, (2) an amount indicated by the number of uncovered unnumbered scale graduations visible to him in between the largest uncovered number of the linear scale and the edge of the sleeve, and (3) a number read from the vernier scale extending around the rotatable sleeve. For example, the dimension 0.260 inch typically would allow the machinist to see the numeral "2" on the linear scale, two scale marks each representing 0.025 inch, and the number "10" on the vernier scale.

Depth micrometer gauges are used to measure inside dimensions, such as the depths of holes and recesses and the like. Typical depth micrometer gauges comprise a body member having a flat surface on one side, a barrel extending from the other side, a shaft member threaded in the barrel with a portion of the shaft passing through the body member and protruding from the flat surface thereof, and a sleeve fastened to the shaft member. As the sleeve and shaft member are rotated in one direction, the end of the shaft member protrudes further from the flat surface, and the edge of the sleeve simultaneously moves along a linear scale marked on the barrel. A vernier scale is also usually provided around the periphery of the sleeve. With such an arrangement, measurement of decreasing dimensions requires that the protruding end of the shaft member be retracted back toward the flat surface, and hence as the shaft is so extended, the sleeve uncovers increasingly smaller numbers marked along the linear scale. Thus while a micrometer caliper gauge has the lower number portion of its linear scale visible and the higher number portion covered by the sleeve, the scale of the usual depth micrometer gauge is just the opposite, having the higher number portion of its scale visible and the lower number portion covered by the sleeve. The machinist can determine the measured dimension (the protrusion of the shaft end from the flat surface) by first noting the lowest number visible on the linear scale, and then subtracting an amount indicated by the number of uncovered unnumbered scale graduations visible to him in between the lowest uncovered number and the edge of the sleeve, and then adding the reading of the vernier scale. For example, the dimension 0.260 inch will allow the machinist to see the numeral "3" on the linear scale, a single unnumbered and uncovered scale mark representing 0.025 inch, and the number "10" on the vernier scale.

Very many machinists must make frequent use in their work of both micrometer caliper gauges and micrometer depth gauges. One type of gauge requires them to add to the last visible number, while the other requires them to both subtract and add, and because of this difference, measurement errors are frequently made, sometimes resulting in ruined work at great expense. Since most machinists use micrometer caliper gauges more often, where only adding is required, the errors made most frequently occur in use of depth micrometer gauges, when dimensions are erroneously added instead of being subtracted. A primary object of the present invention is to provide an improved depth micrometer gauge which may be read directly, or in the same fashion as an ordinary micrometer caliper gauge, thereby to lessen measurement errors.

Another object of the invention is to provide an improved depth micrometer gauge of a direct-reading type having high precision, ruggedness, and which may be compact, and which may be operated easily and conveniently. A further object of the invention is to provide an improved depth gauge micrometer which may be easily dis-assembled for cleaning, and which when reassembled, does not require any precision adjustments for calibration.

Yet another object of the invention is to provide an improved depth micrometer which is simple to fabricate.

Other objects of the invention will in part be obvious and will in part appear hereinafter.

The invention accordingly comprises the features of construction, combination of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 1 is a side view in cross-section, with certain parts cutaway, an exemplary form of depth micrometer gauge constructed in accordance with the present invention.

FIG. 2 is a view taken at lines 2—2 in FIG. 1.
FIG. 3 is a view taken at lines 3—3 in FIG. 1.
FIG. 4 is a view taken at lines 4—4 in FIG. 1.
FIG. 5 is a fragmentary view of the upper end of the instrument, illustrating various portions not shown in the cross-section view of FIG. 1.

The gauge shown in FIGS. 1–5 will be seen to include a conventional base block 20 generally trapezoidal in cross-section with a flat lower surface 20a constituting a reference surface from which measurements are made. The lower end 21a of a hollow shaft 21 is either press-fitted or threaded into bore 20b of block 20, and a smaller bore 20c concentric with bore 20b and shaft 21 extends from bore 20b to surface 20a, allowing rod 22 to slidingly move through bore 20c and extend perpendicularly from reference surface 20a.

Slots 21b, 21c (FIG. 3) are milled on opposite sides of shaft 21 and extend along substantially the entire length of shaft 21 outside of block 20. The upper end of shaft 21 is provided with a portion of lessened diameter, providing annular shoulders against which the end surface of cylindrical fixed barrel 23 is seated. A threaded end portion of shaft 21 passing through the end plate of barrel 23 accommodates an internally-threaded collar 24 preferably having a knurled annular exterior 24a. Threading collar 24 on the upper end of shaft 21 will be seen to clamp barrel 23 at a fixed position along axis x—x relative to shaft 21, and to align barrel 23 coaxially with shaft 21 and axis x—x. Barrel 23 is provided with tabs or legs 23a, 23b (FIG. 4) extending radially-inwardly from the hole 23c in the end of the barrel through which the end of shaft 21 passes, with the tabs engaging slots 21b, 21c and thereby fixing the angular orientation about axis x—x of barrel 23 relative to shaft 21 and block 20.

The internal diameter of barrel 23 is sufficiently greater than the external diameter of shaft 21 to allow the interposition therebetween of an inner sleeve 26 having a flange or base portion of widened diameter indicated at 26a. The flange 26a of inner sleeve 26 is press-fitted into the lower end of concentric outer sleeve 28, and an upper length of outer sleeve 28 is provided with an inner diameter slightly exceeding the outer diameter of barrel 23, thereby allowing easy rotation by hand of outer sleeve 28 relative to barrel 23, but maintaining sleeve 28 in accurate axial alignment. A threaded length along the outer cylindrical surface of inner sleeve 26 threadingly engages a threaded length along the inner cylindrical surface of barrel 23, these cooperating threaded portions having fine, precision-cut threads of carefully controlled pitch, with a pitch of 40 threads per inch, for example.

Rod 22 is provided with an integral flange or ring 22a best seen in FIG. 3, the flange having radially inwardly-extending tabs or fingers 22b, 22c (FIG. 3) which seat in slots 21b, 21c of shaft 21, so that the fingers prevent rotation of rod 22 relative to shaft 21, and hence prevent rotation of rod 22 relative to base block 20. It is deemed highly desirable that the protruding measuring rod not rotate relative to base block 20 as it is extended to contact the bottom of the recess being measured. A portion 22d of rod 22 above flange 22a is provided with a diameter very slightly less than the internal diameter of shaft 21, so that shaft 21 tends to keep rod 22 in accurate axial alignment as rod 22 moves axially along the inner bore of shaft 21. The widened lower portion 28a of outer sleeve 28 is internally threaded to receive externally-threaded collar 30, which is preferably provided with a knurled annular exterior surface 30a. The widened outer surface of sleeve 28 is also preferably knurled.

The upper end of threaded collar 30 is provided with a flat face 30b which seats against flange 26a of inner sleeve 26 and limits threading of collar 30 into outer sleeve 28. Ring or flange 22a is then situated in an annular recess within collar 30, and the axial length of the annular recess is made very slightly greater than that of flange 22a, thereby allowing collar 30 to rotate relative to flange 22a, but not allowing significant axial movement of flange 22a and rod 22 relative to sleeves 26 and 28. While it is possible to provide an annular recess (not shown) at the end of sleeve 26a cooperating with the recess in collar 30, so that ring 22a seats partially in both recesses, the arrangement shown with a single recess in collar 30 is preferred, since it requires that tolerances be maintained in fewer parts. The outside diameter of ring 22a is not critical, and is made sufficiently less than the internal diameter of the recess in collar 30 to allow collar 30 to rotate relative to ring 22a without binding.

When surface 20a of block 20 is held against a workpiece (not shown) and sleeve 28 is rotated, ordinarily with the operator gripping knurled surface, such rotation of sleeve 28 also rotates inner sleeve 26, thereby moving sleeves 26 and 28 axially relative to shaft 21 and barrel 23. The annular outer end 28c of sleeve 28 is preferably chamfered as shown, and its end 28d acts as an index line which is read against a linear scale 32 (FIG. 5) inscribed on barrel 23. The precision threaded connection between sleeve 26 and barrel 23 preferably uses righthand threads, so that clockwise rotation of sleeve 28 (as viewed from the upper end, or right end in FIG. 1) moves sleeves 26 and 28 leftwardly relative to shaft 21 and barrel 23, also moving rod 22 leftwardly without rotating rod 23, and hence causing rod 23 to emerge further from block 20. As outer sleeve 28 moves leftwardly relative to scale 32 on barrel 23, it uncovers increasingly larger numerals. Scale 32 is shown as comprising an axially-extending index line 33 having major and minor graduations extending therefrom, with a numeral inscribed adjacent each major graduation line and three minor graduation lines equally spaced between each adjacent pair of major graduation lines, so that the minor graduation lines divide the space between each pair of major lines into four quarters, with each quarter representing 0.025 inch. The annular chamfered surface 28c of sleeve 28 is divided into 25 equal portions by vernier marks, every fifth one of which is preferably numbered. In FIG. 5 the instrument is shown exhibiting a measurement of 0.260 inch, which dimension one reads in exactly the same manner in which one reads a usual caliper micrometer gauge, i.e., by observing the highest uncovered numeral ("2") on linear scale 32, adding 0.50 for the two minor graduation lines visible between the major graduation line related to that numeral and end 28d of sleeve 28, and adding the 0.010 because the numeral 10 on the vernier scale is aligned with index line 33. It should be recognized that the invention is readily applicable to gauges intended for metric measurement, by using a different thread pitch between sleeve 26 and barrel 23, and differently spaced graduation lines along scale 32, but with the scale numerals still increasing in the direction shown. A plurality of different and interchangeable measuring rods of the nature of rod 22 may be used with the basic gauge illustrated, with different ones of such rods having different lengths of rod extending leftwardly (in FIG. 1) from their ring portions 22a, with such portions of different measuring rods increasing in increments of 1 inch, for example. Then the various measuring rods will extent zero, 1.0, 2.0, etc., inches from the reference surface 20a when the scales read zero, and the different measuring rods will be operative over measurement ranges of 0 — 1.0 inch, 1.0 to 2.0 inches, 2.0 to 3.0 inches, etc. It is important to note that different measurement rods may be substituted very easily by merely loosening collar 30, and that substitution of a different measuring rod requires no adjustment for purposes of calibration.

It will thus be seen that the objects set forth above, among those made apparent from the preceding description, are efficiently attained, and since certain changes may be made in the above construction with departing from the scope of the invention, it is intended that all matter contained in the above description or shown in the accompanying drawings shall be interpreted as illustrative and not in a limiting sense.

The embodiments of the invention in which an exclusive property or privilege is claimed are defined as follows:

1. A depth micrometer gauge, comprising, in combination: a block having a flat surface on one side and a bore extending therethrough perpendicular to said flat surface; a hollow shaft extending perpendicularly to said flat surface from the other side of said block coaxially with said bore; a cylindrical barrel arranged coaxially with said shaft, with the end of said barrel remote from said block affixed to a portion of said shaft remote from said block and a portion of the interior surface of said barrel being threaded; a generally-cylindrical inner sleeve situated radially in between said shaft and said barrel and coaxial therewith, said inner sleeve having a threaded exterior surface portion engaging said threaded interior surface portion of said barrel; a generally-cylindrical outer sleeve coaxially surrounding a portion of the length of said barrel, said outer and inner sleeves being interconnected and rotatable relative to said shaft and said barrel; a measuring rod slidably mounted within said hollow shaft with one end of said rod adapted to be extended through said bore and from said flat surface, said measuring rod being connected to said sleeves so that axial movement of said sleeves relative to said barrel, shaft and block axially moves said measuring rod relative to said block; and a scale inscribed on said barrel adjacent said end remote from said block with scale indicia increasing in the direction toward said block, whereby the end of said outer sleeve remote from said block may be read against said scale on said barrel to indicate the extension of said measuring rod by adding visible portions of said scale.

2. A gauge according to claim 1 wherein said shaft includes axially-extending slot means and said measuring rod includes radially-extending finger means engaging said slot means to prevent rotation of said measuring rod relative to said shaft and said block.

3. A gauge according to claim 1 having means for connecting said measuring rod to said sleeves to provide axial movement of said rod with said sleeves and allow said sleeves to rotate relative to said rod means.

4. A gauge according to claim 1 wherein said scale inscribed on said barrel comprises a graduated line extending axially along said barrel, and wherein said end of said outer sleeve remote from said block carries a second graduated scale inscribed around its periphery.

5. A gauge according to claim 1 wherein a radially widened portion of said measuring rod is connected for axial movement with said sleeves by means engaging said widened portion of said rod and one of said sleeves.

6. A gauge according to claim 1 wherein said measuring rod comprises a first portion adapted to extend through said bore in said block and a second portion remote from said block having a greater diameter than said first portion and slidingly conforming to the inside diameter of said hollow shaft.

7. A gauge according to claim 5 wherein said means engaging said widened portion of said rod comprises a collar means adapted to be threaded a predetermined distance into one of said sleeves, said collar means having a recess receiving said widened portion of said rod.

8. A depth micrometer gauge, comprising, in combination: a block having a fat surface on one side and a bore extending therethrough perpendicular to said flat surface; a hollow shaft extending perpendicularly to said flat surface from the other side of said block coaxially with said bore; a cylindrical barrel arranged coaxially with said shaft, with the end of said barrel remote from said block affixed to a portion of said shaft remote from said block and a surface portion of said barrel being threaded; a generally cylindrical sleeve means having a threaded surface portion engaging said threaded surface portion of said barrel, said sleeve means being rotatable relative to said shaft, said block and said barrel; a measuring rod slidably mounted within said hollow shaft with one end of said rod adapted to be extended through said bore and from said flat surface, said sleeve means engaging a portion of said measuring rod so that axial movement of said sleeve means relative to said block axially moves said measuring rod relative to said block; and a scale inscribed on said barrel adjacent said end remote from said block with scale indicia increasing in the direction toward said block, whereby a portion of said sleeve means remote from said block may be read against said scale on said barrel to indicate the extension of said measuring rod by adding visible portions of said scale.

* * * * *